(12) United States Patent
Adams et al.

(10) Patent No.: US 9,154,469 B2
(45) Date of Patent: *Oct. 6, 2015

(54) SYSTEM AND METHOD OF PROTECTING DATA ON A COMMUNICATION DEVICE

(71) Applicant: BLACKBERRY LIMITED, Waterloo (CA)

(72) Inventors: Neil Patrick Adams, Waterloo (CA); Herbert Anthony Little, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,028

(22) Filed: Feb. 25, 2013

(65) Prior Publication Data
US 2013/0166908 A1 Jun. 27, 2013

Related U.S. Application Data

(63) Continuation of application No. 13/303,214, filed on Nov. 23, 2011, now Pat. No. 8,386,778, which is a continuation of application No. 10/546,779, filed as application No. PCT/CA03/00291 on Feb. 28, 2003, now Pat. No. 8,078,869.

(51) Int. Cl.
*H04L 9/00* (2006.01)
*H04L 29/06* (2006.01)
(Continued)

(52) U.S. Cl.
CPC ........ *H04L 63/0428* (2013.01); *G06F 21/6218* (2013.01); *G06F 21/71* (2013.01); *G06F 2221/2105* (2013.01);
(Continued)

(58) Field of Classification Search
CPC ................ G06F 21/6218; G06F 21/71; G06F 2221/2105; G06F 2221/2107; H04M 1/72522; H04L 63/0428; H04L 63/045
USPC ............ 713/164, 166, 189, 193; 380/30, 277; 726/26, 27
See application file for complete search history.

(56) References Cited

U.S. PATENT DOCUMENTS 6,085,323 A * 7/2000 Shimizu et al. ................ 713/150
8,078,869 B2 12/2011 Adams et al.
(Continued)

FOREIGN PATENT DOCUMENTS

| AU | 2007216818 | 9/2007 |
|----|------------|--------|
| AU | 2003208208 | 2/2008 |

(Continued)

OTHER PUBLICATIONS

Prosecution Documents for U.S. Appl. No. 10/546,779, issued to U.S. Pat. No. 8,078,869 on Dec. 13, 2011.
(Continued)

*Primary Examiner* — Bao Tran N To
(74) *Attorney, Agent, or Firm* — Integral Intellectual Property Inc.; Miriam Paton; Amy Scouten

(57) ABSTRACT

A system and method of protecting data on a communication device are provided. Data received when the communication device is in a first operational state is encrypted using a first cryptographic key and algorithm. When the communication device is in a second operational state, received data is encrypted using a second cryptographic key and algorithm. Received data is stored on the communication device in encrypted form.

19 Claims, 8 Drawing Sheets

(51) Int. Cl.
  *G06F 21/62*  (2013.01)
  *G06F 21/71*  (2013.01)
  *H04M 1/725*  (2006.01)
(52) U.S. Cl.
  CPC ...... *G06F 2221/2107* (2013.01); *H04L 63/045* (2013.01); *H04M 1/72522* (2013.01)

(56) References Cited

U.S. PATENT DOCUMENTS

| | | | |
|---|---|---|---|
| 8,386,778 B2 | 2/2013 | Adams et al. | |
| 2002/0103008 A1 | 8/2002 | Rahn et al. | |
| 2003/0068041 A1* | 4/2003 | Wee et al. | 380/200 |
| 2003/0105734 A1* | 6/2003 | Hitchen et al. | 707/1 |
| 2003/0147267 A1* | 8/2003 | Huttunen | 365/63 |
| 2006/0190724 A1 | 8/2006 | Adams et al. | |

FOREIGN PATENT DOCUMENTS

| | | |
|---|---|---|
| CA | 2516568 | 4/2011 |
| CN | 1354448 | 6/2002 |
| DE | 60309937 | 10/2007 |
| EP | 1595381 | 11/2006 |
| EP | 1734723 | 12/2010 |
| HK | 1083957 | 1/2007 |
| JP | 3214834 | 9/1991 |
| JP | 2001243441 | 9/2001 |
| JP | 2001268071 | 9/2001 |
| JP | 2001320355 | 11/2001 |
| JP | 2002229861 | 8/2002 |
| JP | 2009285748 | 5/2010 |
| JP | 2010104018 | 5/2010 |
| JP | 4482460 | 6/2010 |
| KR | 100716529 | 5/2007 |
| WO | 02/32046 | 4/2002 |
| WO | 02/073861 A2 | 9/2002 |
| WO | 2004077782 | 9/2004 |

OTHER PUBLICATIONS

Notification of Grant. Singapore Patent Application No. 200706299-5. Dated: Mar. 15, 2013.
Certificate of Grant of Patent. Singapore Patent Application No. 200706299-5. Dated: Mar. 15, 2013.
Australian Exam Report. Application No. 2003208208. Dated: Sep. 20, 2006.
Australian Notice of Acceptance. Application No. 2003208208. Dated: Oct. 18, 2007.
Chinese First Office Action (English Translation). Application No. 03826051.4. Dated: Nov. 28, 2008.
Singapore Notification of Grant. Application No. 200505290-7. Dated: Sep. 28, 2007.
Canadian Office Action. Application No. 2,516,568. Dated: Oct. 20, 2008.
European Search and Examination Report. Application No. 06115509.9. Dated: Dec. 21, 2007.
CREDANT: "Credant Mobile Guardian Shield" [Online] Feb. 12, 2003, XP002460942 Retrieved from the Internet: URL: http://web.archive.org/web/20030218145836/www.credant.com/proShield.html [retrieved on Dec. 3, 2007].
UTIMACO: "Secure Authentication and Confidentiality for Your Mobile Device" [Online] Feb. 2, 2003, XP002460943 Retrieved from the Internet: URL: http://web.archive.org/web/20030212084942/www.utimaco.com/eng/indexmain.html [retrieved on Dec. 3, 2007].
TRUSTDIGITAL: "PDAsecure" [Online] Oct. 1, 2002, XP002460944 Retrieved from the Internet: URL:http://web.archive.org/web/20021004035811/www.trustdigital.com/prod1.htm [retrieved on Dec. 3, 2007].
PALM: "Securing the handheld environment—An Enterprise Perspective" [Online] 2001, XP002460945 Retrieved from the Internet:
URL:http://cnscenter.future.co.kr/resource/hot-topic/wlan/securing_env.pdf [retrieved on Dec. 3, 2007].
Australian First Examination Report. Application No. 2007216818. Dated: Mar. 27, 2009.
Chinese Notification of Grant. Application No. 03826051.4. Dated: Jan. 26, 2011.
Certificate of Grant. Singapore Application No. 200505290-7. Dated: Sep. 28, 2007.
Notice of Allowance. Canadian Application No. 2,516,568. Dated: Aug. 12, 2010.
Notice of Acceptance. Australian Application No. 2007216818. Dated: Apr. 23, 2010.
Singapore Written Opinion and Search Report. Application No. 200706299-5. Dated: Oct. 7, 2010.
Japanese Notice of Final Rejection (English translation). Application No. 2004-568606. Dated: Sep. 29, 2009.
Japanese First Office Action (English translation). Application No. 2004-568606. Date of Mailing: May 7, 2009.
Douglas Comer/translated by Murai, Jun and Kusumoto, Hiroyuki. "Bit separate volume 3rd edition, TCP/IP ni yoru Nettowaku Kouchiku [Network Construction by TCP/IP], vol. 1", Japan, Kyoritsu Shuppan Co., Ltd, Nov. 10, 1996, p. 78-86, principle, protocol and architecture.
Chinese Office Action (English translation). Application No. 03826051.4. Dated: Jul. 17, 2009.
Yu, Song and Wenqing, Zhao, "Application Research on Key Management in Management Information System", Computer Engineering and Application, Oct. 31, 1999.
Korean Notice of Decision for Patent Application No. 10-2005-7015955. Date: Mar. 16, 2007.
Korean Search Report. Application No. 10-2005-7015955. Dated: Sep. 28, 2006.
Communication under Rule (51)4 EPC; Re: European Application No. 03706161.1. Dated: Jan. 30, 2006.
International Search Report for PCT Patent Application No. PCT/CA03/00291, Dated:Nov. 8, 2003.
Written Opinion for PCT Patent Application No. PCT/CA2003/00291, Dated: May 18, 2004.
Certificate of Grant. European Patent Application No. 03706161.1. Dated: Nov. 22, 2006.
Decision to Grant. European Patent Application No. 06115509.9. Dated: Nov. 5, 2010.
Communication under Rule 71(3) EPC. European Patent Application No. 06115509.9. Dated: Jun. 23, 2010.
Certificate of Grant. European Patent Application No. 06115509.9. Dated: Dec. 1, 2010.
Communication pursuant to Article 96(2) EPC. European Patent Application No. 03706161.1. Dated: Jun. 7, 2006.
International Preliminary Examination Report dated Jun. 2, 2005, International Patent Application No. PCT/CA03/00291.
Japanese Notice of Allowance dated Mar. 9, 2010, Japanese Patent Application No. 2004-568606.
Chinese Office Action (English Translation) dated Nov. 13, 2009, Chinese Patent Application No. 03826051.4.
Hong Kong Certificate of Grant dated Jan. 19, 2007, Hong Kong Patent Application No. 06105492.6.
Communication under Rule 71(1) EPC. European Patent Application No. 06115509.9. Dated: Apr. 21, 2010.
European Response for European Patent Application No. 03706161.1, dated Aug. 10, 2006.
European Response for European Patent Application No. 06115509.9, dated May 6, 2010.
European Response for European Patent Application No. 06115509.9, dated Mar. 19, 2009.
Japanese Office Action for Japanese Patent Application No. 2009-285748, dated Apr. 25, 2012.
Japanese Withdrawal for Japanese Patent Application No. 2009-285748, dated Jul. 18, 2012.
Indian First Office Action for Indian Patent Application No. 3754/DELNP/2005, dated Jan. 27, 2012.

* cited by examiner

SYSTEM AND METHOD OF PROTECTING DATA ON A COMMUNICATION DEVICE

CROSS-REFERENCE TO RELATED APPLICATIONS

This application is a continuation of U.S. patent application Ser. No. 13/303,214, filed Nov. 23, 2011, and issued to patent as U.S. Pat. No. 8,386,778, which is a continuation of U.S. patent application Ser. No. 10/546,779, filed Aug. 25, 2005, and issued to patent as U.S. Pat. No. 8,078,869, which is a National Stage Entry of PCT/CA03/00291, filed on Feb. 28, 2003. The entire contents of U.S. application Ser. No. 13/303,214, U.S. application Ser. No. 10/546,779 and of PCT International Application No. PCT/CA03/00291 are hereby incorporated by reference.

TECHNICAL FIELD

This invention relates generally to data protection, and in particular to protection of data on a communication device.

DESCRIPTION OF THE STATE OF THE ART

In a corporate environment, employees are often provided with access to office supplies and equipment to be used in performing job functions, typically including at least a personal computer (PC), and often also include wireless mobile communication devices and other types of electronic devices. Confidential or otherwise sensitive user information, employer information, or both, may be stored on any of this equipment. Although user equipment, such as a PC, which remains at an employer's premises is physically secured by the employer, portable or mobile devices, by their nature, are more likely to be misplaced or stolen, and are thus less secure. It is therefore often desirable to protect sensitive information on mobile devices to prevent an unauthorized party from accessing such information on lost or stolen user equipment.

One common type of security measure for mobile devices enabled for communications, such as wireless mobile communication devices, for example, is to ensure that sensitive information is transferred to such mobile devices securely. Although information transfer is secure, these measures only protect information during transfer, not after the information has been received by a mobile device.

According to another known security scheme, received information is encrypted when or before it is stored in a memory. Decryption of stored encrypted information requires access to a cryptographic key. Symmetric key cryptography, in which a single key is used for both encryption and decryption, is generally preferred for mobile devices having limited processing resources, because symmetric key cryptographic operations are faster and less processor-intensive than those associated with other cryptography schemes. Access to this single key must be controlled, using password protection for example, so that an unauthorized user cannot simply read the key from memory on a lost or stolen mobile device and then decrypt all encrypted content stored on the mobile device. However, this may result in situations where the key is not accessible when information is received at a mobile device.

SUMMARY

A system of protecting data on a communication device having a first operational state and a second operational state comprises a key store configured to store a plurality of cryptographic keys, a memory configured to store data, and a data protection system configured to receive data, to determine whether the communication device is in the first operational state or the second operational state, to encrypt the received data using a first of the plurality of cryptographic keys where the communication device is in the first operational state or a second of the plurality of cryptographic keys where the communication device is in the second operational state, and to store the encrypted received data in the memory.

A method of protecting data on a communication device comprises the steps of storing a first protected cryptographic key and a second cryptographic key on the communication device, receiving data at the communication device, determining whether the first protected cryptographic key is accessible, encrypting the received data using the first protected cryptographic key where the first protected cryptographic key is accessible, encrypting the received data using the second cryptographic key where the first protected cryptographic key is inaccessible, and storing the encrypted received data in memory on the communication device.

Further features of data protection systems and methods will be described or will become apparent in the course of the following detailed description.

DETAILED DESCRIPTION

Figure 1:
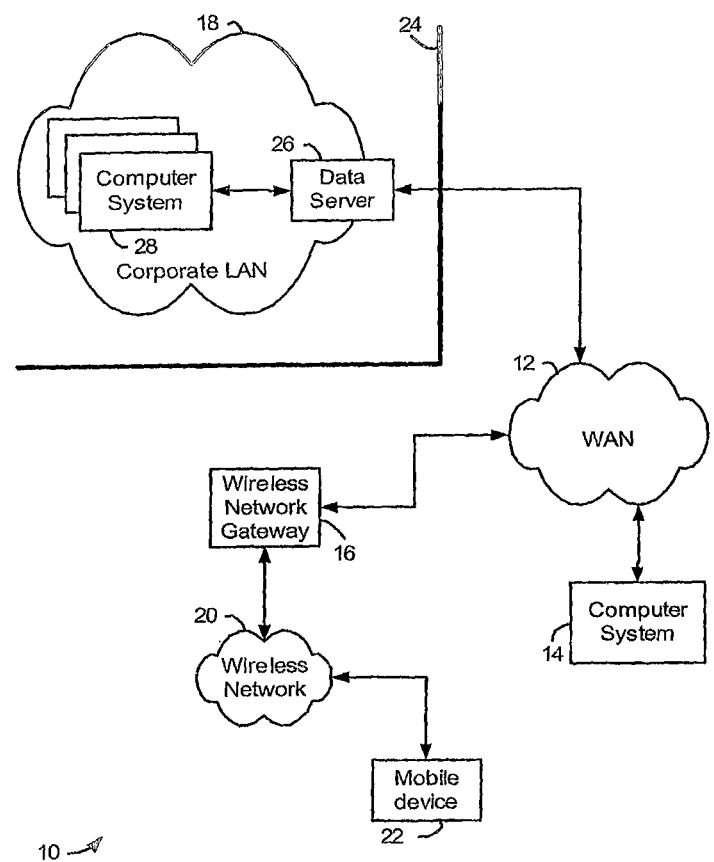
FIG. 1 is a block diagram showing a communication system in which mobile devices may be used.

FIG. 1 is a block diagram showing a communication system in which mobile devices may be used. The communication system 10 includes a Wide Area Network (WAN) 12, coupled to a computer system 14, a wireless network gateway 16 and a corporate Local Area Network (LAN) 18. The wireless network gateway 16 is also connected to a wireless communication network 20 in which a wireless mobile communication device, the mobile device 22, is configured to operate.

The computer system 14 may be a desktop or laptop PC, which is configured to communicate to the WAN 12, the Internet, for example. PCs, such as the computer system 14, normally access the Internet through an Internet Service Provider (ISP), Application Service Provider (ASP) or the like.

The corporate LAN 18 is an example of a typical working environment, in which multiple computers 28 are connected in a network. Such a network is often located behind a security firewall 24. Within the corporate LAN 30, a data server 26, operating on a computer behind the firewall 24, acts as the primary interface for the corporation to exchange data both within the LAN 18, and with other external systems and devices via the WAN 12. The data server 26 may, for example, be a messaging server such as a Microsoft™ Exchange Server or a Lotus Domino™ server. These servers also provide additional functionality, such as dynamic database storage for data like calendars, todo lists, task lists, e-mail and documentation. Although only a data server 26 is shown in the LAN 18, those skilled in the art will appreciate that a LAN may include more than one server, including other types of servers supporting resources that are shared between the networked computer systems 28.

The data server 26 provides data communication capabilities to networked computer systems 28 coupled to the LAN 18. A typical LAN 18 includes multiple computer systems 28, each of which implements an appropriate client for communications with the data server 26. In the above example of electronic messaging, within the LAN 18, messages are received by the data server 26, distributed to the appropriate mailboxes for user accounts addressed in the received message, and are then accessed by a user through a messaging client operating on a computer system 28. Exchange of other types of data than electronic messages is similarly enabled using clients compatible with the data server 26. Multiple-purpose clients such as Lotus Notes, for example, handle electronic messages as well as other types of files and data.

The wireless gateway 16 provides an interface to a wireless network 20, through which data, including data that should be protected, may be exchanged with a mobile device 22. The mobile device 22 may, for example, be a data communication device, a dual-mode communication device such as many modern mobile telephones having both data and voice communications functionality, a multiple-mode device capable of voice, data and other types of communications, a personal digital assistant (PDA) enabled for wireless communications, or a wireless modem operating in conjunction with a laptop or desktop computer system or some other device. An exemplary mobile device is described in further detail below.

Such functions as addressing of the mobile device 22, encoding or otherwise transforming messages for wireless transmission, or other necessary interface functions are performed by the wireless network gateway 16. Where the wireless network gateway 16 is configured to operate with more than one wireless network 20, it also determines a most likely network for locating a given mobile device 22 and possibly tracks mobile devices as users roam between countries or networks. Although only a single wireless network gateway 16 is shown in FIG. 1, the mobile device 22 could be configured to communicate with more than one gateway, such as a corporate network gateway and a WAP gateway, for example.

Any computer system with access to the WAN 12 may potentially exchange data with the mobile device 22 through the wireless network gateway 16, provided the mobile device 22 is enabled for such communications. Alternatively, private wireless network gateways such as wireless Virtual Private Network (VPN) routers could also be implemented to provide a private interface to a wireless network. For example, a wireless VPN implemented in the LAN 18 may provide a private interface from the LAN 18 to one or more mobile devices such as 22 through the wireless network 20 without requiring the wireless network gateway 16. Such a private interface to a mobile device 22 via the wireless network gateway 16 and/or the wireless network 20 may also effectively be extended to entities outside the LAN 18 by providing a data forwarding or redirection system that operates in conjunction with the data server 26.

A wireless network 20 normally delivers data to and from communication devices such as the mobile device 22 via RF transmissions between base stations and devices. The wireless network 20 may, for example, be a data-centric wireless network, a voice-centric wireless network, or a dual-mode network that can support both voice and data communications over the same infrastructure. Recently developed voice and data networks include Code Division Multiple Access (CDMA) networks, Groupe Special Mobile or the Global System for Mobile Communications (GSM) and General Packet Radio Service (GPRS) networks, and third-generation (3G) networks like Enhanced Data rates for Global Evolution (EDGE) and Universal Mobile Telecommunications Systems (UMTS), which are currently under development. Older data-centric networks include, but are not limited to, the Mobitex™ Radio Network ("Mobitex"), and the DataTAC™ Radio Network ("DataTAC"), and known voice-centric data networks include Personal Communication Systems (PCS) networks like GSM and Time Division Multiple Access (TDMA) systems that have been available in North America and world-wide for several years.

In the system 10, a company which owns the corporate LAN 18 may provide an employee with a mobile device 22 and access to the corporate LAN 18. Corporate data can then be accessed and stored on the mobile device 22. Where the user of the mobile device 22 has access to the LAN 18 through a computer system 28 with which the mobile device 22 can also communicate, other paths for accessing and storing corporate data on the mobile device 22 are available. Although such data is commonly protected while being transferred to the mobile device 22 by using secure communication techniques, these techniques do not protect the data once it is received and stored at the mobile device 22.

As described above, encryption of data when or before the data is stored in memory on the mobile device 22 offers some measure of security. To reduce data access time delays and processor load associated with data decryption, symmetric key cryptography is preferred. However, security measures implemented to protect the symmetric key may also render the key inaccessible when data is received. For example, where the mobile device 22 implements password protection, a symmetric key used for data encryption might be accessible only when the mobile device 22 has been unlocked by correct entry of a security password or passphrase. In this example, if the mobile device 22 receives data when it is locked, where data is pushed to the mobile device 22 without having been requested, the symmetric key is not accessible, and the data cannot be encrypted for storage.

Systems and methods according to aspects of the present invention provide for protection of received data when a mobile device is in any of a plurality of states.

Figure 2:
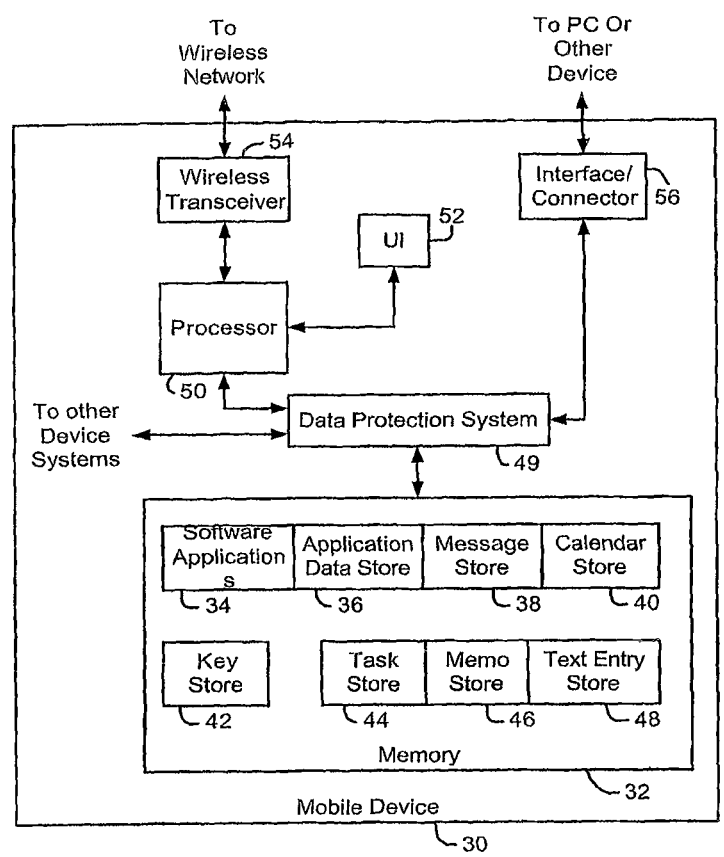
FIG. 2 is a block diagram of a mobile device in which a system and method of data protection are implemented.

FIG. 2 is a block diagram of a mobile device in which a system and method of data protection are implemented. It should be apparent to those skilled in the art that only the components involved in a data protection system are shown in FIG. 2. A mobile device typically includes further components in addition to those shown in FIG. 2.

The mobile device 30 comprises a memory 32, a data protection system 49, a processor 50, a user interface (UI) 52, a wireless transceiver 54, and an interface or connector 56. The memory 32 preferably includes a storage area 34 for software applications, a key store 42, and a plurality of data stores 36-40 and 44-48.

The memory 32 is, or at least includes, a writeable store such as a RAM into which other device components may write data. The software application store 34 includes software applications that have been installed on the mobile device 30, and may include, for example, an electronic messaging application, a personal information management (PIM) application, games, as well as other applications. The application data store 36 stores information associated with the software applications on the mobile device 30, including not only data, such as cached web pages for a browser application, or files used by software applications, but also configuration data for software applications. Electronic messages such as received and/or sent email messages are stored in the message store 38. Data such as schedule information, appointments, and reminders are stored in the calendar store 40. The task store 44 is used to store tasks that a user wishes to track. Notes and memos entered by a user are stored in the memo store 46. The text entry store 48 stores a word list or dictionary which supports, for example, predictive text entry and automatic error correction when text is entered on the mobile device 30. Although shown as separate data stores, those skilled in the art will appreciate that some or all of the stores could be consolidated into a single data store in the memory 32. It should also be apparent that a mobile device may include further, fewer, or different data stores than those shown in FIG. 2.

The key store 42 stores cryptographic keys used to support data protection on the mobile device 30, and preferably resides in a secure memory component or a secured part of the memory 32 to which access is controlled. For example, a user or a software application should not be able to delete or change a data protection key in the key store 42. In one embodiment, access to the key store 42 is restricted to the data protection system 49. The data protection system 49 encrypts received data and decrypts encrypted data stored in the memory 32, as described in further detail below.

The processor 50 is connected to the wireless transceiver 54 and thus enables the mobile device 30 for communications via a wireless network. The interface/connector 56 provides an alternate communication path to a PC or other device having a cooperating interface or connector. The interlace/connector 56 could be any of a plurality of data transfer components, including, for example, an optical data transfer interface such as an Infrared Data Association (IrDA) port, some other short-range wireless communications interface, or a wired interface such as serial port, a Universal Serial Bus (USB) port, or a Secure Digital (SD) slot. Known short-range wireless communications interfaces include, for example, Bluetooth™ modules and 802.11 modules. It will be apparent to those skilled in the art that "Bluetooth" and "802.11" denote sets of specifications, available from the Institute of Electrical and Electronics Engineers (IEEE), relating to wireless LANs and wireless personal area networks, respectively. Therefore, a communication link established via the interface/connector 56 may be a wireless connection or a physical wired connection.

The UI 52 includes such UI components as a keyboard or keypad, a display, or other components which accept inputs from or provide outputs to a user of the mobile device 30. Although shown as a single block in FIG. 2, it should be apparent that a mobile device typically includes more than one UI, and the UI 52 is therefore intended to represent one or more user interfaces.

Data in any or all of the data stores on a mobile device may be protected as described herein. In most implementations, it is unlikely that software applications installed on a mobile device would be protected, although the other data stores 36-38 and 44-48 commonly store data that a user, for personal data, or an employer, for corporate data, may wish to protect.

In the mobile device 30, access to the memory 32 is controlled by the data protection system 49, which encrypts received data and stores encrypted data to the memory 32, and decrypts stored data for other mobile device components. All other components of the mobile device 30 are connected to the data protection system 49 and memory read and write operations by these other components are performed through the data protection system 49. Data received by the data protection system 49, from the wireless transceiver 54 or the UI 52 through the processor 50, from a software application being executed by the processor 50, or from the interface/connector 56, is encrypted using a key stored in the key store 42. Similarly, when a request for protected data is received by the data protection system 49 from a component or software application on the mobile device 30, the data protection system 49 decrypts the encrypted data and passes the decrypted data to the requesting component. The data protection system 49 is implemented as either a software module or utility that may be enabled or disabled, as described in further detail below, or a hardware module configured to manage the memory 32, specific parts of the memory 32, or particular data stores or types of data.

It should be appreciated that the arrangement shown in FIG. 2 is intended for illustrative purposes only, and that the invention is in no way limited thereto. For example, in an alternative embodiment, the processor 50, the interface/connector 56, and other device systems have access to the memory 32, and interact with a data protection system when encrypted data retrieved from the memory 32 is to be decrypted and received data is to be encrypted before it is stored to the memory 32. In this case, mobile device systems and components pass data to the data protection system for encryption and decryption when necessary, but access the memory 32 directly. Although the arrangement shown in FIG. 2 provides for tighter control of data protection in that access to the memory 32 is controlled by the data protection system 49, this alternative embodiment simplifies support for non-protected data stores since non-protected data is retrieved directly from the memory 32 without any involvement by the data protection system.

In operation, the data protection system 49 accesses cryptographic keys in the key store 42. According to an aspect of the invention, the key store 42 stores several keys. As described above, symmetric cryptography is generally preferred for processor-constrained mobile devices, such that the a symmetric key used for both encryption and decryption of protected data is stored in the key store 42 when data protection is enabled. Although a security password or passphrase secures the mobile device 30 against unauthorized use, further measures are generally preferred to protect symmetric keys, and thus encrypted data, against so-called hardware attacks. For example, password protection does not protect memory content where physical components comprising the memory 32 are removed from the mobile device 30 to directly read the data stored therein. The symmetric key is thus preferably stored in the key store 42 in an encrypted form. Decryption of the symmetric key requires correct entry of a user's password.

Once decrypted, the symmetric key is typically stored in the key store 42 or another memory area or cache so that it need not be decrypted each time it is needed. However, the decrypted symmetric key is preferably deleted when the mobile device 30 is locked, in response to a user command or automatically after a preset security timeout period or when the mobile device 30 is stored in a carrying case or holster, for example. The next time the mobile device 30 is unlocked with a correct password, the encrypted symmetric key is again decrypted.

Although the above key encryption scheme provides a high level of protection for a symmetric key and thus data encrypted using the symmetric key, no decrypted version of the symmetric key is available when the mobile device 30 is locked. As such, any data received when the mobile device 30 is locked cannot be encrypted using the symmetric key. Maintaining the decrypted symmetric key in memory after the mobile device 30 is locked, so that data can be encrypted when the mobile device 30 is locked, leaves the data stored in the memory 32 prone to hardware attacks. Alternatively, the user could be prompted to enter the password every time data is received. Unless the user immediately enters the password, however, the received data must be stored in the clear, at least until the next time the user unlocks the mobile device 30, or simply not stored on the mobile device 30. In the latter case, the received data is dropped at the mobile device 30 and must be retransmitted to the device.

In accordance with an aspect of the invention, the key store 42 also stores a public/private key pair. A public key is not secret, and is therefore stored in the clear, even when the mobile device 30 is locked. Data encrypted using the public key can only be decrypted using the private key, which can be protected in a similar manner as a symmetric key. Thus, the public key is used to encrypt data received when the mobile device 30 is locked.

Therefore, a first cryptographic key, the symmetric key, is used to encrypt data received when the mobile device 30 is in a first, unlocked, operational state, and a second cryptographic key, the public key, is used to encrypt data received when the mobile device 30 is in a second, locked, operational state. The benefits of symmetric key cryptography are thereby realized for any data received when the mobile device 30 is unlocked. Decryption of such data is faster and less processor-intensive relative to other cryptographic schemes. On the other hand, the above shortfall of using a protected symmetric key is avoided by storing a public key for data encryption when the mobile device 30 is locked. Data encrypted using the public key is decrypted using the corresponding private key. Although public key cryptography is generally slower than symmetric key cryptography, data access delays associated with data decryption are preferably reduced by choosing a public key cryptographic scheme having fast decryption operations. For example, elliptic curve cryptography (ECC) offers significantly faster decryption than Rivest-Shamir-Adleman (RSA) techniques.

Figure 3:
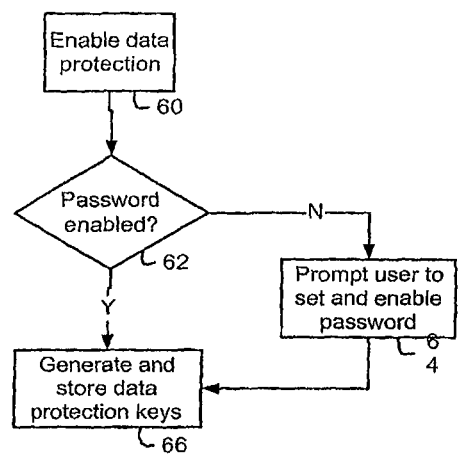
FIG. 3 is a flow diagram illustrating a method of enabling data protection.

As described briefly above, the data protection system 49 may be implemented as a software module or utility that is enabled when data is to be protected. FIG. 3 is a flow diagram illustrating a method of enabling data protection. At step 60, an operation to enable data protection is executed by a mobile device. This operation is preferably invoked by a user of the mobile device, by entering a command or selecting a menu item using a keyboard, keypad, mouse, thumbwheel, or other input device, for example. However, it should also be appreciated that a mobile device is preferably configurable to require that a user enable data protection. For example, where an employer provides a mobile device to an employee user but wishes to ensure that any corporate data on the mobile device is protected, a configuration control software module or utility and configuration control information specifying that data protection must be enabled, are inserted onto the mobile device either before the mobile device is provided to the user or when the mobile device is first configured for operation by the user. The configuration control module then automatically invokes the operation at step 60, or restricts some or all other mobile device operations until data protection has been enabled.

In order to protect a symmetric key used for data encryption and a private key used for data decryption, password protection should also be enabled when or before data protection is enabled. At step 62, a determination is made as to whether password protection has already been enabled. Where password protection has not been enabled, the user is prompted to enable password protection and set a password at step 64. Data protection keys are then generated and stored to a key store at step 66, where password protection has already been enabled or after the user has enabled password protection at step 64.

The data protection keys generated at step 66 include a symmetric key used for both encrypting data received when the mobile device is in an unlocked state before the data is stored in memory on the mobile device and for decrypting this encrypted data when retrieved from memory. As described above, this symmetric key is itself encrypted using the password established by the user. A public/private key pair is also generated at step 66. The public key is stored in the clear, since it need not be kept secret, and is used to encrypt data received when the mobile device is in a locked state. Data encrypted using the public key can only be decrypted using the private key, such that compromise of the public key is not a security concern. However, the private key, like the symmetric key, is preferably stored in the key store in an encrypted form, by encrypting the private key using the password, for example.

Figure 4:
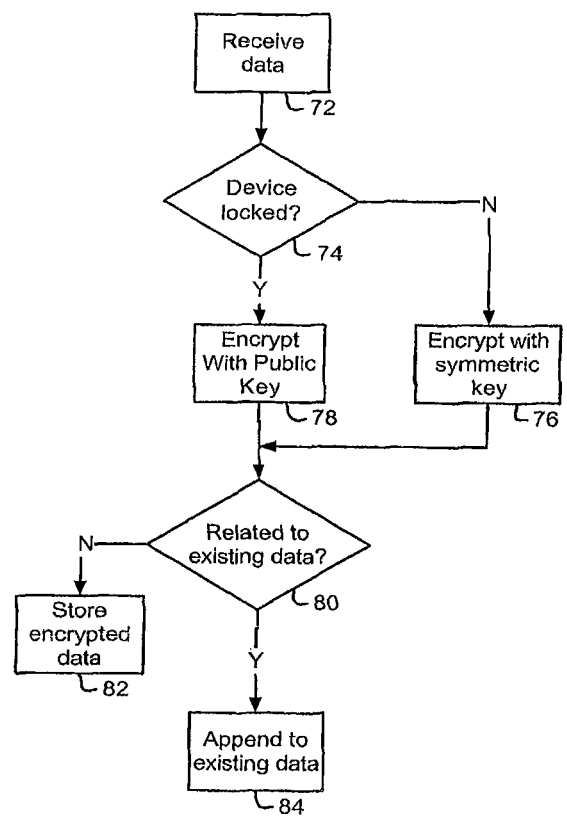
FIG. 4 is a flow diagram illustrating a method of protecting data received at a mobile device.

Any data received at a mobile device after data protection has been enabled is encrypted before it is stored in memory. FIG. 4 is a flow diagram illustrating a method of protecting data received at a mobile device.

At step 72, data is received at the mobile device. Referring to FIG. 2, the mobile device 30 is configured to receive data via the wireless transceiver 54 or the interface/connector 56, as well as user inputs via the UI 52. Software applications also typically generate data for storage in the memory 32. Where other interfaces are provided, such as a disk drive or memory stick reader for example, step 72 also includes operations of receiving data from those interfaces.

The current operational state of the mobile device is then determined at step 74. Where the device is locked, the public key is retrieved and the received data is encrypted using the public key at step 78. If the mobile device is unlocked, then the symmetric key is available. The decrypted symmetric key is retrieved from the key store or a cache if it was decrypted when the mobile device was unlocked by correctly entering a password. Otherwise, the encrypted symmetric key is retrieved from the key store, decrypted, and then used to encrypt the received data at step 76.

According to a further aspect of the invention, a determination is made at step 80 as to whether the received data is related to existing data that has already been stored on the mobile device. At step 82, the encrypted received data is stored to memory where it is not related to existing data. If the received data is related to existing data, then the encrypted received data is appended to the existing data at step 84. For example, when a sender of the received data, or an intermediate system such as the data server 26 or the wireless network gateway 16 in FIG. 1, is configured to send data to the mobile device in blocks of up to a predetermined size, then a large data item is split into separate blocks that are sent to the mobile device. In this case, each data block associated with a particular data item received after a first data block for the same data item is related to any previously received data blocks for the data item.

Those skilled in the art will appreciate that where a data item is separated into data blocks, each block includes information that allows a receiver to reconstruct the data item. This information is typically in the form of a session identifier, a data item identifier, a file name, a sequence number, or some other identifier that is used at the receiver to identify other data blocks for the data item. Although each data block is encrypted when received at the mobile device, a data item identifier or transformed version thereof such as a hash of the identifier, is preferably stored at the mobile device in the clear and used in step 80 to determine whether the received data is related to existing data.

Figure 5A:
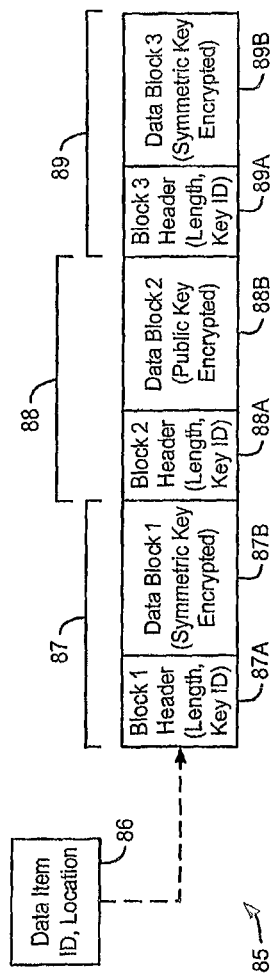
FIG. 5A is a block diagram of a data format.

If a data item includes multiple data blocks, then each data block is encrypted and stored as it is received. Although each data block comprises a part of the same data item, the data blocks are encrypted separately, using an algorithm and key dependent upon the operational state of the mobile device when that data block is received. Therefore, a received multiple-block data item is stored as a series of independently encrypted data blocks. FIG. 5A is a block diagram of a data format that supports such data items.

The data item 85 includes a data item reference 86 and three data item parts 87, 88, and 89. The data item parts 87, 88, and 89 are preferably stored in a byte array referenced by the data item reference 86. The data item reference 86 includes a data item identifier, such as an email message identifier or a session identifier, for example, and a location of or pointer to the byte array in which the data item parts 87, 88, and 89 are stored. The data item identifier supports the determination at step 80 in FIG. 4, and, in conjunction with the location, allows the data item parts 87, 88, and 89 to be retrieved. Each data item part 87, 88, and 89 includes a data block header 87A, 88A, or 89A and a data block 87B, 88B, or 89B. The data block headers 87A, 88A, and 89A include a length and a key identifier corresponding to each data block 87B, 88B, and 89B in the data item 85. The data block length in a data block header indicates the length, or alternatively a location of or pointer to an end of the corresponding data block, so that each data block can be properly retrieved. The key identifier indicates the key, the cipher algorithm, or both, that was used to encrypt a data block or is required to decrypt the data block. The data blocks 87B, 88B, and 89B represent received data blocks, comprising a single data item, that have been encrypted.

In the example shown in FIG. 5A, data block 1 was received when the mobile device was unlocked, and as such was encrypted using the symmetric key to generate the encrypted data block 876. The length of the encrypted data block 87B is determined, and this length and a "symmetric" key identifier are added to the encrypted data block 87B as the block header 87A. The block header 87A and the encrypted data block 87B are then stored to memory.

A data item reference is preferably created and stored when a data item, or the first data block of a multiple-block data item, is received on a mobile device, so that the data item can be retrieved and subsequently received related data blocks can be identified and appended to the corresponding byte array referenced by the data item reference. Thus, the data item reference 86 was created when data block 1 was received, or possibly after data block 1 was encrypted and stored on the mobile device, and includes an identifier of the data item and a location indicating where the data item part 87 has been or will be stored.

The second data block in the data item, data block 2, was received when the mobile device was locked, and therefore was encrypted using the public key. The block 2 header 88A is generated and added to the encrypted data block 88B as described above, and the resultant data item part 88 including the block header 88A and the encrypted data block 88B are appended to the data item part 87 in the array referenced by the data item reference 86. The third data block, data block 3, like data block 1, was received while the mobile device was unlocked, and was encrypted using the symmetric key. The data part 89, comprising the block header 89A and the encrypted data block 89B, is similarly appended to the data item part 88 in the array referenced by the data item reference 86.

In this manner, subsequent data blocks of a data item are encrypted, a block header is generated and added to the encrypted data block, and the block header and the encrypted data block are appended to a preceding encrypted data block. In one known scheme for effectively adding new data to an existing byte array, a new array is defined, contents of an existing array are copied to the new array, and the new data is written into the new array. The memory space occupied by the existing array is then de-referenced or otherwise reclaimed for storage of other data. The copying process in this technique tends to be slow, and is memory intensive in that it requires sufficient available memory space for two copies of the existing data array. The appending scheme described above is faster and requires less memory space than this known technique.

When the data item 85 is to be accessed, such as when a user selects the data item for display, the byte array in which the data item parts 87, 88, and 89 are found is located in the memory using the location in the data item reference 86. For each encrypted data block 87B, 88B, and 898, the appropriate decryption scheme and length for the encrypted data block is determined from the key identifier and length in the corresponding block header 87A, 88A, and 89A. Each of the encrypted data blocks 87B, 88B, and 89B is read from the byte array and decrypted, and the decrypted data blocks are combined into a single decrypted data item which corresponds to the data item that was transmitted to the mobile device.

Those skilled in the art will appreciate that although the data item parts 87, 88, and 89 are shown in FIG. 5A and described above as being stored in a byte array, the data item parts need not necessarily be stored in contiguous memory locations. Memory pointers or other identifiers are typically used to logically link blocks.

Figure 5B:
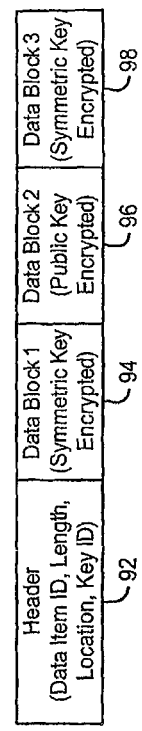
FIG. 5B is a block diagram of an alternative data format.

FIG. 5B is a block diagram of an alternative data format. The data item 90 represents the logical structure of a data item, and includes a data item header 92 and three encrypted data blocks 94, 96, and 98. The header 92 includes a data item identifier and such information as a length, location, and key identifier for each data block 94, 96, and 98 in the data item 90. The header 92 and data blocks 94, 96, and 98 are preferably logically linked, but need not necessarily be stored in contiguous memory locations.

As in the example described above with reference to FIG. 5A, the data blocks 1, 2 and 3 were received when the mobile device was unlocked, locked, and unlocked, respectively. Data blocks 1 and 3 were encrypted using the symmetric key, and data block 2 was encrypted using the public key. The header 92 was preferably created and stored when the first data block 94 was received, encrypted, and stored on the mobile device, so that the first data block 94 can be properly retrieved and decrypted, and subsequently received related data blocks can be identified. Information for the second and third encrypted data blocks 96 and 98 was added to the header 92 when these data blocks were received. When the mobile device is unlocked and the data item 90 is accessed on the mobile device, each block is located using the location and length in the header 92, the appropriate decryption scheme is determined from the key identifier in the header 92, and each data block is then retrieved, decrypted, and combined to reconstruct the data item.

As described above and shown in FIGS. 5A and 5B, a single data item may include data blocks which were encrypted using different encryption schemes, where the data blocks were received at the mobile device when the mobile device was in different operational states. It is also possible that the mobile device is in the same operating state when data blocks for the same data item are received. For example, if data block 2 were received when the mobile device was in the unlocked state, then it would also have been encrypted using the symmetric key. In accordance with a further aspect of the invention, before a received data block is encrypted, it is determined whether a current operational state of the mobile device is the same as the operational state of the mobile device when a preceding data block of the same data item was received. Where the operational state, and thus the data protection key, is the same for the received data and a preceding data block of a data item, both the preceding block and the received data are encrypted in the same manner. In this case, the preceding data block is preferably decrypted if possible, the received data block is appended to the decrypted preceding data block to form a combined data block, and the combined data block is encrypted and stored to memory. Since the preceding data block is part of the encrypted combined data block, memory space occupied by the preceding data block is either overwritten with the encrypted combined data block or made available to store other data.

This type of operation is possible, for example, when a preceding block and received data are received while the symmetric key is accessible. Where the preceding block and the received data are received when the device is locked and encrypted using the public key, the private key is not accessible, and the preceding block cannot be decrypted. However, a similar decryption and re-encryption process is possible when the private key becomes accessible, such as when the preceding block and the received data are accessed, as described in further detail below.

Although this decryption/re-encryption provides for combining more than one data block into a single encrypted data block, appending encrypted data blocks as described above involves less time, memory, and data processing, and is therefore generally preferred on constrained mobile devices with limited power, memory, and processing resources.

Figure 6:
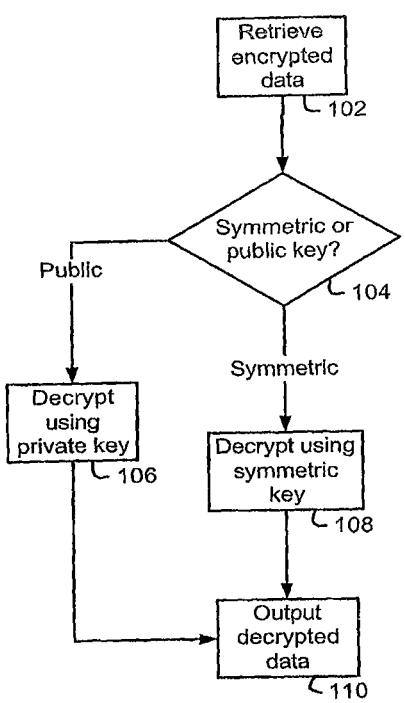
FIG. 6 is a flow diagram showing a method of accessing protected data.

FIG. 6 is a flow diagram showing a method of accessing protected data. At step 102, a data protection system or a mobile device system or component, depending upon how the data protection system and memory access scheme are implemented, retrieves encrypted data. The data protection system then determines whether the encrypted data was encrypted using a symmetric key or a public key, based on a key identifier. A corresponding private key is used to decrypt the encrypted data at step 106 where the encrypted data was encrypted using a public key. The symmetric key is used to decrypt the encrypted data at step 108 where the encrypted data was encrypted using the symmetric key. Decrypted data is then output to the mobile device system or component which retrieved or requested the data. If the retrieved data comprises a plurality of data blocks, then the steps 104 through 110 are performed for each data block.

The decryption steps 106 and 108 assume that the public key or the symmetric key are accessible. As long as the mobile device is unlocked when protected data is accessed, these keys are either available from memory or can be decrypted. If the keys are not accessible, then the protected data cannot be decrypted.

As described above, public key cryptography is typically slower than symmetric key cryptography. Each time data that is received while the mobile device is locked, or a data item including such data, is decrypted, public key decryption operations must be performed on the mobile device. When such data is decrypted at step 106, then the decrypted data is available on the mobile device. During decryption operations, the mobile device is in an unlocked state, such that the symmetric key is also accessible. According to another aspect of the invention, decrypted data that was previously encrypted using the public key is re-encrypted using the symmetric key. If necessary, a data item header is also updated accordingly. Alternatively, where any data blocks of a data item were encrypted using the public key, the decrypted data blocks are concatenated to form a single combined data block, which is then re-encrypted using the symmetric key. The original data item is then replaced in memory with the re-encrypted data item. In this manner, further public key decryption operations are avoided when the data item is subsequently accessed.

It should also be appreciated that maintaining separate encrypted data blocks for a multiple-block data item may instead be preferred. For example, where a multiple-block data item is an email message, displaying the message in an "Inbox" or message list might require data from only a first data block. In this case, building the message list is much faster if just the first data block of each message, instead of each entire message, is decrypted.

The particular implementation and configuration of a data protection system and method depend upon the type of device in which data protection is provided. Interaction between a user and a data protection system may be different for different types of devices. FIGS. 7-11 are screen shots of a display on a mobile device in which a system and method of data protection are implemented, as an illustrative example of one possible implementation. The screen shots in FIG. 7-11 are representative of screens displayed to a user on a mobile device display at various stages during configuration of security features. In FIGS. 7-11, data protection is referred to as content protection.

Figure 7:
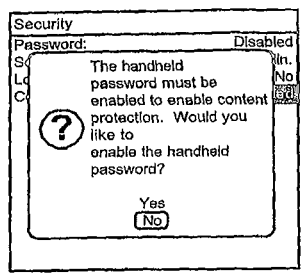
FIGS. 7-11 are screen shots of a display on a mobile device in which a system and method of data protection are implemented.

In FIG. 7, a user has selected an operation to enable content protection on the mobile device. However, as shown at the top of FIG. 7, password protection has not yet been enabled, and the user is prompted to enable password protection. If the user enables password protection, by moving a cursor from "No" to "Yes" and selecting "Yes", then the user sets a password and security timeout period, 2 minutes in this example (FIG. 8), and password protection is enabled. If password protection is not enabled, and no alternate means of securing data protection keys is available, then content protection cannot be enabled. These above operations are substantially as shown at steps 60, 62, and 64 of FIG. 3.

Figure 8:
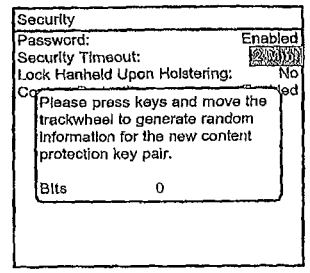
Figure 9:
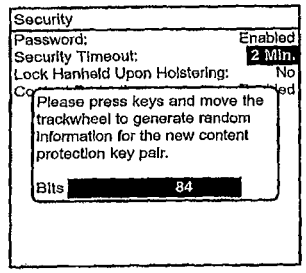

Once password protection has been enabled, content protection keys are generated. In FIG. 8, the content protection key pair is a public/private key pair. Pseudo-random data is gathered for the key generation operation from user key presses on a keypad or keyboard and movement of a thumbwheel input device on the mobile device. On a PC, such data is typically gathered using mouse movements. However, most mobile devices have smaller displays and no mouse, such that keyboard keys are used in conjunction with the thumbwheel input device to provide further randomized data than could be generated using either key presses or thumbwheel inputs alone. FIG. 9 shows a screen which provided feedback to a user indicating the progress of pseudo-random information collection. In a preferred embodiment, 160 bits of data are collected used as the private key, from which the public is generated. A symmetric key is similarly generated when content protection is enabled, using either the same pseudo-random information or further pseudo-random information collected in a similar manner. The number of key presses and thumbwheel movements is preferably reduced by using the same pseudo-random information for both key generation operations. Where a data protection system is configured to use a 160-bit private key and a 128-bit symmetric key, for example, 160 bits of random information are collected and used as the private key, and 128 of the 160 bits are used as the symmetric key.

Figure 10:
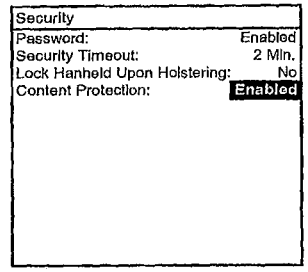

When the data protection keys have been generated and stored, data protection is enabled, and a security options screen appears as shown in FIG. 10. Where the mobile device implements other security features, the security options screen provides access to enable, disable, or configure these features, as well as content protection. In FIG. 10, a security feature of locking the mobile device when it is placed in a carrying holster is accessible through the security options screen.

Figure 11:
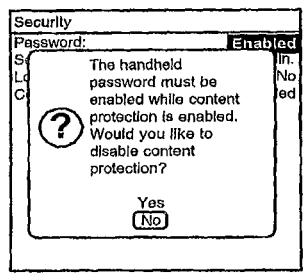

As a further security measure, any configuration requirements for content protection preferably cannot be disabled while content protection is enabled. For example, disabling password protection sacrifices the security of the private key and the symmetric key. When a user attempts to disable password protection while content protection is enabled, the alert message shown in FIG. 11 is displayed. Password protection is not disabled unless content protection is also disabled. Some types of mobile device also support configuration control information to further control which features can be enabled and disabled by a user.

When content protection is disabled, several operations are possible. In one embodiment, stored encrypted data is maintained in encrypted form. The data protection keys are decrypted and then re-encrypted with a predetermined password known to or accessible by the data protection system. Although stored encrypted data is maintained, decryption of the data protection keys, and thus decryption of encrypted data when it is accessed, does not require entry of a user password. In this scheme, the same data protection keys can be used if content protection is enabled again. In an alternative embodiment, all stored encrypted data is decrypted and replaced in memory when content protection is disabled. No decryption operations are then required for subsequent access to stored data. If content protection is re-enabled, then new data protection keys are generated or obtained, stored data may be encrypted where possible, and subsequently received data is encrypted as described above.

Figure 12:
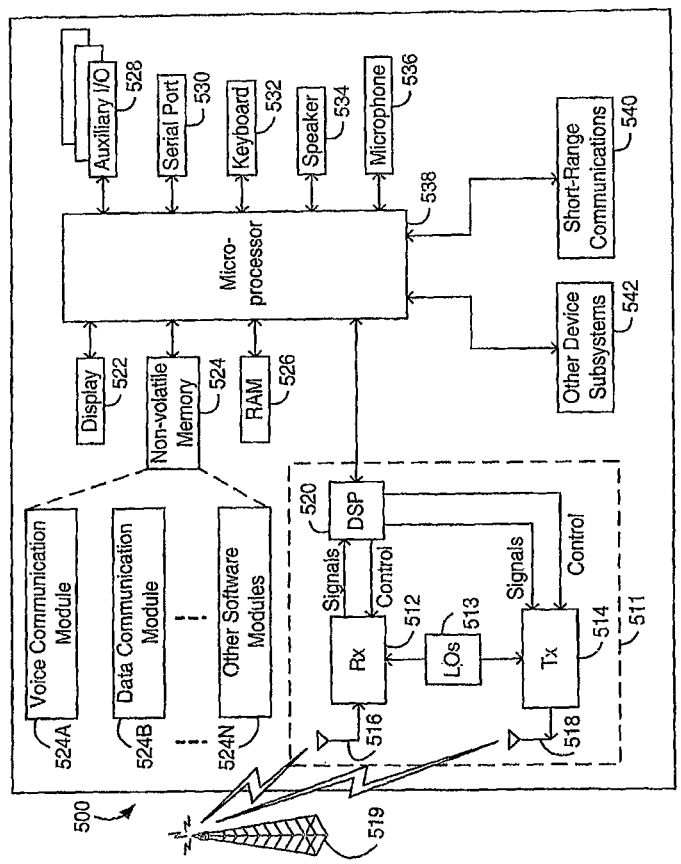
FIG. 12 is a block diagram of a wireless mobile communication device.

FIG. 12 is a block diagram of a wireless mobile communication device. The mobile device 500 is preferably a two-way communication device having at least voice and data communication capabilities. The mobile device 500 preferably has the capability to communicate with other computer systems on the Internet. Depending on the functionality provided by the mobile device 500, it may be referred to as a data messaging device, a two-way pager, a mobile telephone with data messaging capabilities, a wireless Internet appliance, or a data communication device (with or without telephony capabilities). As mentioned above, such devices are referred to generally herein simply as mobile devices.

The mobile device 500 includes a transceiver 511, a microprocessor 538, a display 522, non-volatile memory 524, random access memory (RAM) 526, auxiliary input/output (I/O) devices 528, a serial port 530, a keyboard 532, a speaker 534, a microphone 536, a short-range wireless communications sub-system 540, and other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the non-volatile memory 524, the mobile device 500 includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 12 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications or the mobile device 500 is enabled for communications on more than one network 519, then a plurality of LOs 513 can be used to generate frequencies corresponding to those used in the network 519. Although two antennas 516, 518 are depicted in FIG. 12, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., is dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Communication network access requirements for the mobile device 500 also vary depending upon the type of network 519. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 is unable to carry out functions involving communications over the network 519, other than any legally required operations, such as '911' emergency calling.

After any required network registration or activation procedures have been completed, the mobile device 500 is able to send and receive communication signals, preferably including both voice and data signals, over the network 519. Signals received by the antenna 516 from the communication network 519 are routed to the receiver 512, which provides for signal amplification, frequency down conversion, filtering, channel selection, etc., and analog to digital conversion. Analog to digital conversion of the received signal allows more complex communication functions, such as digital demodulation and decoding, to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown for both voice and data communications, in alternative embodiments, the mobile device 500 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. High-level communication applications, including the voice communication application 524A, and the data communication application 524B are stored in the non-volatile memory 524 for execution by the microprocessor 538. For example, the voice communication module 524A provides a high-level user interface operable to transmit and receive voice calls between the mobile device 500 and a plurality of other voice devices via the network 519. Similarly, the data communication module 524B provides a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, the RAM 526, the auxiliary I/O devices 528, the serial port 530, the keyboard 532, the speaker 534, the microphone 536, the short-range communications subsystem 540, and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O devices 528, keyboard 532, speaker 534, or microphone 536.

Some of the subsystems shown in FIG. 12 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as the non-volatile memory 524. In addition to the operating system and communication modules 524A-N, the non-volatile memory 524 may include a file system for storing data. The non-volatile memory 524 also includes at least a key store, as well as protected data described above. The operating system, specific device applications or modules, or parts thereof, are typically temporarily loaded into a volatile store, such as the RAM 526 for faster operation. Moreover, received communication signals may also be temporarily stored to RAM 526, before permanently writing them to a file system located in the non-volatile memory 524. The non-volatile memory 524 may be implemented, for example, with Flash memory, non-volatile RAM, or battery backed-up RAM.

An exemplary application module 524N that may be loaded onto the mobile device 500 is a PIM application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The non-volatile memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 is manually synchronized with a host system by placing the mobile device 500 in an interface cradle, which couples the serial port 530 of the mobile device 500 to a serial port of the host system. The serial port 530 may also be used to download other application modules 524N for installation on the mobile device 500. This wired download path may further be used to load encryption keys onto the mobile device 500 for use in secure communications, which is a more secure method than exchanging encryption information via the wireless network 519. As an alternative to the on-device data protection key generation described above, data protection keys could be generated by another system and transferred to the mobile device 500 in this manner.

Software application modules 524N may be loaded onto the mobile device 500 through the network 519, through an auxiliary I/O subsystem 528, through the short-range communications subsystem 540, or through any other suitable subsystem 542, and installed by a user in the non-volatile memory 524 or RAM 526. Such flexibility in application installation increases the functionality of the mobile device 500 and may provide enhanced on-device functions, communication-related functions, or both. For example, secure communication applications may enable electronic commerce functions and other such financial transactions to be performed using the mobile device 500.

When the mobile device 500 is operating in a data communication mode, a received signal, such as a text message or a web page download, is processed by the transceiver 511 and provided to the microprocessor 538, which preferably further processes the received signal for output to the display 522, or, alternatively, to an auxiliary I/O device 528. When data protection is enabled, received data is encrypted as described above before being stored on the mobile device 500. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with the plurality of auxiliary I/O devices 528, which may include a thumbwheel input device, a touchpad, a variety of switches, a rocker input switch, etc. The composed data items input by the user are then transmitted over the communication network 519 via the transceiver 511, and may also be stored in encrypted form on the mobile device 500.

When the mobile device 500 is operating in a voice communication mode, the overall operation of the mobile device 500 is substantially similar to the data mode, except that received signals are output to the speaker 534 and voice signals for transmission are generated by a microphone 536. Alternative voice or audio I/O devices, such as a voice message recording subsystem, may also be implemented on the mobile device 500. The display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522. Although the data protection techniques described above might not necessarily be applied to voice communications, since voice communication signals are not typically stored, some voice communication-related information such as contact information, may be protected.

A short-range communications subsystem 540 is also be included in the mobile device 500. For example, the subsystem 540 may include an infrared device and associated circuits and components, or a Bluetooth or 802.11 short-range wireless communication module to provide for communication with similarly-enabled systems and devices.

It will be appreciated that the above description relates to preferred embodiments by way of example only. Many variations on the systems and methods described above will be obvious to those knowledgeable in the field, and such obvious variations are within the scope of the invention as described and claimed, whether or not expressly described.

For example, a device in which systems and methods described above may be implemented may include fewer, further, or different components than those shown in the drawings. Although data protection is perhaps most pertinent to mobile devices, which by their nature are difficult to physically secure, the techniques described herein are also applicable to PCs, as well as other typically fixed systems.

The invention is also in no way dependent upon any particular communication features. Data protection as described herein could be implemented in two-way or one-way (receive only) communication devices.

In addition, although data protection has been described above primarily in the context of data received after data protection has been enabled, existing data that has already been stored on the mobile device before data protection is enabled is preferably also encrypted when data protection is enabled, where the format of stored data permits.

We claim:
1. A method of protecting data on a mobile device, the method comprising:
   prior to any storage of data received at the mobile device in a non-volatile memory of the mobile device:
      encrypting the data received at the mobile device using a first cryptographic key if the first cryptographic key is accessible; and
      encrypting the received data using a second cryptographic key if the first cryptographic key is not accessible; and
   storing the received data in encrypted form in the non-volatile memory,
   wherein, in the event that the received data is related to existing data in encrypted form stored in the non-volatile memory, storing the received data in encrypted form comprises appending the received data in encrypted form to the existing data in encrypted form.

2. The method of claim 1, wherein the first cryptographic key comprises a symmetric key, and wherein the second cryptographic key comprises a public key associated with a private key.

3. The method of claim 2, further comprising:
   receiving a request for data from a system on the mobile device, wherein the requested data was encrypted using the symmetric key; and
   decrypting the requested data using the symmetric key.

4. The method of claim 2, further comprising:
   receiving a request for data from a system on the mobile device, wherein the requested data was encrypted using the public key; and
   decrypting the requested data using the private key.

5. The method of claim 1, wherein the data received at the mobile device comprises a data item having a data item identifier, and wherein the method further comprises:
   creating a data item reference comprising the data item identifier and a location of the data in the non-volatile memory, after the data is encrypted; and
   storing the data item reference in the non-volatile memory.

6. The method of claim 1, wherein the data received at the mobile device and the existing data comprise data blocks of a data item, and wherein the data item is associated with a data item reference comprising a data item identifier and a location of the existing data in the non-volatile memory.

7. The method of claim 6, wherein appending the received data in encrypted form to the existing data in encrypted form in the non-volatile memory comprises:
   generating an identifier indicating whether the received data in encrypted form was encrypted using the first cryptographic key or the second cryptographic key;
   adding a length of the received data and the identifier to the received data in encrypted form; and
   appending the length, the identifier, and the received data in encrypted form to the existing data in encrypted form.

8. The method of claim 1, further comprising:
   prior to the encrypting, enabling data protection on the mobile device by:
      providing, in a user interface of the mobile device, a prompt to enable a locked operational state in which the first cryptographic key is not accessible; and
      in response to a user input received in response to the prompt:
         enabling the locked operational state; and generating the first cryptographic key, the second cryptographic key, and a decryption key associated with the second cryptographic key; and encrypting the first cryptographic key and the decryption key associated with the second cryptographic key.

9. The method of claim 8, further comprising disabling the locked operational state, wherein the disabling comprises:

decrypting the encrypted first cryptographic key and the encrypted decryption key associated with the second cryptographic key; and re-encrypting the first cryptographic key and the decryption key associated with the second cryptographic key using a password known to or accessible by a data protection module on the mobile device.

10. The method of claim 9, wherein the disabling is in response to another user input received in the user interface of the mobile device.

11. The method of claim 8, further comprising disabling the locked operational state, wherein the disabling comprises:

decrypting, using the first cryptographic key, encrypted data stored in the non-volatile memory that was encrypted using the first cryptographic key;

decrypting, using the decryption key associated with the second cryptographic key, encrypted data stored in the non-volatile memory that was encrypted using the second cryptographic key; and storing the decrypted data in the non-volatile memory.

12. The method of claim 11, wherein the disabling is in response to another user input received in the user interface of the mobile device.

13. A mobile device comprising:

a microprocessor and a non-volatile memory, wherein the microprocessor is configured to:

prior to any storage of data received at the mobile device in the non-volatile memory:

encrypt the data received at the mobile device using a first cryptographic key if the first cryptographic key is accessible; and encrypt the received data using a second cryptographic key if the first cryptographic key is not accessible; and store the received data in encrypted form in the non-volatile memory, wherein, in the event that the received data is related to existing data in encrypted form stored in the non-volatile memory, storing the received data in encrypted from comprises appending the received data in encrypted form to the existing data in encrypted form.

14. The device of claim 13, wherein the data received at the mobile device is received via a wireless communication network.

15. The device of claim 13, wherein the device is configured to operate in any one of a locked operational state, in which the first cryptographic key is not accessible, and an unlocked operational state, in which the first cryptographic key is accessible.

16. The device of claim 15, wherein the first cryptographic key comprises a symmetric key, and wherein the second cryptographic key comprises a public key associated with a private key.

17. The device of claim 16, wherein the microprocessor is further configured to store the private key in a key store of the mobile device.

18. The device of claim 13, wherein the microprocessor is further configured to:

enable data protection on the mobile device;

provide, in a user interface of the mobile device, a prompt to enable a locked operational state in which the first cryptographic key is not accessible, if the locked operational state is not enabled on the mobile device; and generate the first cryptographic key, the second cryptographic key, and a decryption key associated with the second cryptographic key if the locked operational state is enabled on the mobile device.

19. A non-transitory computer-readable medium comprising computer-readable instructions that, when executed by a processor of a mobile device, cause the mobile device to protect data on the mobile device, the instructions comprising:

prior to any storage of data received at the mobile device in a non-volatile memory of the mobile device:

instructions for encrypting the data received at the mobile device using a first cryptographic key if the first cryptographic key is accessible; and instructions for encrypting the received data using a second cryptographic key if the first cryptographic key is not accessible; and instructions for storing the received data in encrypted form in the non-volatile memory, wherein, in the event that the received data is related to existing data in encrypted form stored in the non-volatile memory, the instructions for storing the received data in encrypted form comprise instructions for appending the received data in encrypted form to the existing data in encrypted form.

* * * * *